July 4, 1967 — S. SAMSON — 3,329,203
REPAIR ANCHOR NUT FOR A GAS VAPORIZER
Filed May 7, 1965
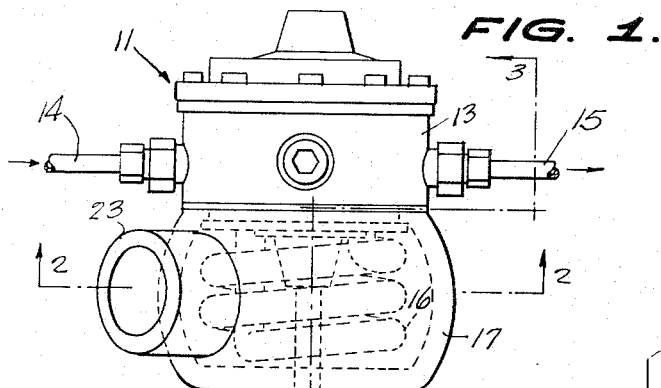
FIG. 1.
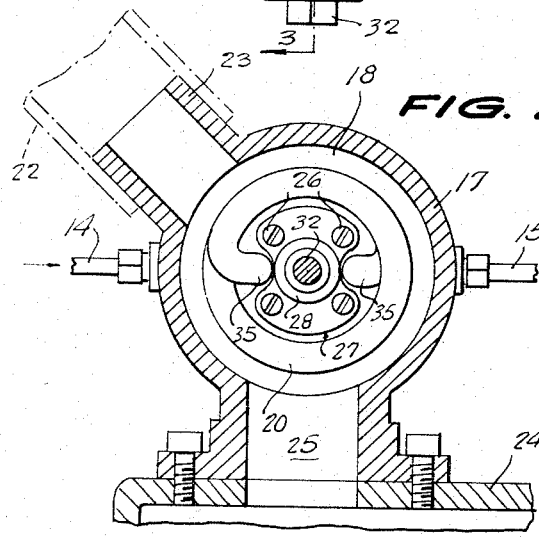
FIG. 2.
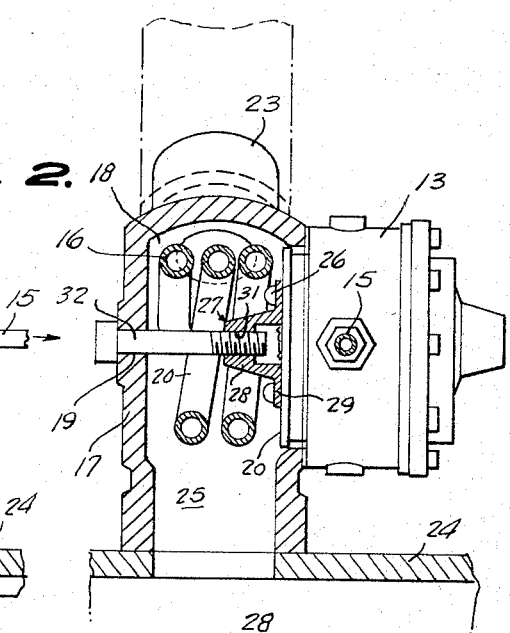
FIG. 3.
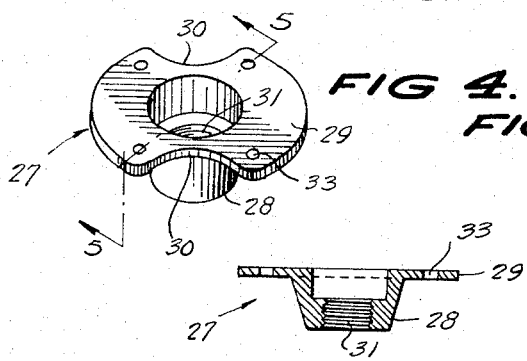
FIG 4.
FIG. 5.
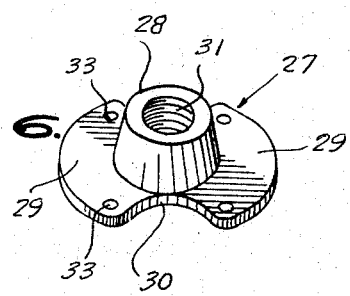
FIG. 6.
INVENTOR.
SAM SAMSON,
BY
Berman, Davidson & Berman
ATTORNEYS.

United States Patent Office 3,329,203
Patented July 4, 1967

3,329,203
REPAIR ANCHOR NUT FOR A GAS VAPORIZER
Sam Samson, 15000 Dickens, Apt. 2,
Sherman Oaks, Calif. 91403
Filed May 7, 1965, Ser. No. 454,025
3 Claims. (Cl. 165—51)

ABSTRACT OF THE DISCLOSURE

A gas vaporizing assembly of the type comprising a main body having an exposed helical gas vaporizing coil adjacent one wall thereof and a housing surrounding said coil, said housing being anchored to said wall of the main body by a bolt passing substantially axially through the coil and being threadedly-engaged with a flanged replaceable anchor nut bolted to said wall of the main body.

---

This invention relates to fastening devices for housings, and more particularly to an anchor nut intended for use in conjunction with the housing fastening bolt of a gas vaporizer assembly as a means for replacing a tapped wall element of the assembly which has failed through corrosion.

A main object of the invention is to provide a novel and improved repair anchor nut for use in conjunction with the anchoring bolt of a gas vaporizing housing assembly, the anchor nut being simple in construction, being easy to install, and enabling the main operating portion of a gas vaporizer to be secured to its associated housing in spite of the deterioration of the original wall portion of the main operating unit originally intended as the anchor means for the housing fastening bolt.

A further object of the invention is to provide an improved replacement anchor nut element for use with a gas vaporizer assembly after the original bolt-anchoring portion of the assembly has failed through corrosion, the repair anchor nut being inexpensive to manufacture, being very compact in size so that it does not occupy excessive volume in the interior of the vaporizer housing in which it is employed, and may be installed without any structural modifications of the elements of the varporizer assembly.

Further objects and advantages of the invention will become apparent from the following description and claims, and from the accompanying drawing, wherein:

FIGURE 1 is a top plan view of a conventional fuel gas vaporizer of the type with which a repair anchor nut according to the present invention is intended to be employed.

FIGURE 2 is a vertical cross-sectional view taken substantially on the line 2—2 of FIGURE 1, and showing a repair anchor nut according to the present invention installed in the interior of the vaporizer housing.

FIGURE 3 is a transverse vertical cross-sectional view taken substantially on the line 3—3 of FIGURE 1, showing the repair anchor nut in longitudinal vertical cross-section.

FIGURE 4 is a bottom perspective view, to an enlarged scale, of the repair anchor nut employed in the vaporizer assembly of FIGURES 1 to 3.

FIGURE 5 is a vertical cross-sectional view taken substantially on the line 5—5 of FIGURE 4.

FIGURE 6 is a top perspective view of the repair anchor nut shown in FIGURES 4 and 5.

Referring to the drawing, 11 generally designates a conventional fuel gas vaporizing unit, similar to "Bendix Vaporizer," Model A962A, manufactured by Zenith Carburetor Division, Detroit, Mich. This vaporizer unit is employed on various types of equipment employing engines using vaporized liquid fuel, such as butane or propane fuel, wherein the fuel is delivered from storage tanks in substantially liquid form and is converted into combustible vapor by passing through a vaporizing assembly, such as the assembly 11. The vaporizer assembly comprises a main body 13 containing suitable valves for admitting the liquid fuel material from an inlet conduit 14 and for discharging the vaporized fuel material from an outlet conduit 15. The assembly includes a coiled conduit 16 through which the fuel material in substantially liquid form flows, being exposed in a heat-transfer housing 17 which is in communication with the water-cooling system of the associated engine, the housing 17 having the interior heat-transfer space 18, as shown in FIGURE 3, which is exposed to the circulating cooling water, said water coming into contact with the coil 16 and raising its temperature so that the liquid fuel circulating therethrough is converted into gas.

In the specific design of vaporizer assembly mentioned above, the body 13 is normally clamped to the housing 17 by a fastening bolt which passes through an aperture 19 in the vertical main outer wall of the housing 17 and engages in a tapped opening in the inner wall 20 of the vaporizer body 13. The inner wall 20 is frequently made of a material which is not very resistant to rotting or corrosion, so that the original tapped portion receiving the fastening bolt corrodes away and it has, therefore, been necessary heretofore to replace the vaporizer operating body 13 or to replace the entire vaporizer assembly.

In the specific unit above-described, the hot water enters the lower portion of the vaporizer housing 17 from the engine block 24 through a bottom passage 25, moving upwardly past the coils 16 and leaving the chamber 18 through a top conduit fitting 23 connected by a flexible radiator hose section 22 to the top of the radiator of the associated engine. The water from the engine block 24 thus enters the housing at a very high temperature, which tends to accelerate the corrosion of the inner wall element of the operating unit 13.

In the specific vaporizer assembly 11, above-identified, the main operating body 13 includes four fastening screws 26 which are located on a common radius and which are angularly-spaced at equal intervals around the axis of the fastening bolt employed to secure housing 17 to the inner wall 20 of operating unit 13. In accordance with the present invention, an anchor nut, shown generally at 27, is employed to replace the corroded or rotted wall portion originally employed in cooperation with the housing fastening bolt to secure the housing 17 to the body 13. Thus, the repair anchor nut 27 is made of suitable corrosion-resistant material, such as brass, or the like, and consists of a frusto-conical annular main body portion 28 provided with a flange at its base consisting of opposing arcuate lip members 29, 29 located on opposite sides of the main body portion 28, the flange being formed with diametrically-opposed arcuate notches 30, 30 between the flange lip portions 29, 29. The anchor nut main body 28 is provided with internal threads 31 to receive a housing fastening bolt 32, and is further formed with apertures 33 spaced to receive the four fastening screws 26 already present at the inner wall of the operating body 13. The lip members 29, 29 and the notches 30, 30 are arranged so that the anchor nut may be inserted axially into the coil 16, the notches 30, 30 providing clearance for the opposite end portions 35, 35 of the coil, as shown in FIGURE 2, thus, facilitating the insertion of the repair anchor nut 27 by providing the necessary clearance for the coil ends 35, 35.

In installing the anchor nut, the screws 26 are first removed, after which the anchor nut 27 is inserted through the conduit coil 16, as above-explained, with the conduit end portions 35, 35 received in the notches 30, 30, and with the holes 33 registered with the openings normally receiving the screws 26. The screws 26 are thereafter reinserted through the holes 33 and are tightened, whereby the anchor nut 27 is securely clamped to the inner wall 20 of the operating body portion 13. Thereafter, the body portion 13 is secured to the housing 17 in its normal manner with the fastening bolt 32 extending through the aperture 19 and threadedly engaged in the internally-threaded opening 31 of the anchor nut body 28 in the manner illustrated in FIGURE 3. It will thus be apparent that the anchor nut 27 provides an efficient and satisfactory replacement for the original tapped opening in wall 20 employed in conjunction with the housing fastening bolt.

As will be readily apparent, the bolt 32 may be shorter than the original bolt employed if said original bolt is too long to be used with the bushing. However, under ordinary circumstances, the original bolt can be employed with the repair anchor nut inasmuch as the wall 20 is provided with an opening normally intended to receive the end of the bolt. However, in many cases, the original bolt is somewhat corroded and it is usually advisable to replace the bolt, so that in making the replacement, a shorter bolt, such as the bolt 32 illustrated, may be used.

While a specific embodiment of an improved repair anchor nut for a fuel gas vaporizer assembly has been disclosed in the foregoing description, it will be understood that various modifications within the spirit of the invention may occur to those skilled in the art. Therefore, it is intended that no limitations be placed on the invention, except as defined by the scope of the appended claims.

What is claimed is:

1. In a gas vaporizer, a main operating assembly comprising a main body including fluid inlet and outlet conduit connections and a helical vaporizing coil projecting from one side of said main body and communicating with said inlet and outlet connections, a heat transfer housing receiving said vaporizing coil and engaging the peripheral margin of said one side of the main body around the coil, an internally-threaded anchor nut member adjacent to said one side of the main body and received substantially coaxially in said coil and having a flange portion provided with opposed notches to receive the ends of the coil, the outer diameter of the flange portion being smaller than the coil inner diameter so that the flange portion is receivable within the coil, means to fasten said flange portion to said one side of the main body, and a fastening bolt extending through the wall of the housing substantially axially in the coil and threadedly engaged with said anchor nut member.

2. In a gas vaporizer, a main operating assembly comprising a main body including fluid inlet and outlet conduit connections and a helical vaporizing coil projecting from one side of said main body and communicating with said inlet and outlet connections, a heat transfer housing receiving said vaporizing coil and engaging the peripheral margin of said one side of the main body around the coil, an anchor nut member adjacent to said one side of the main body, said anchor nut member being provided with an outwardly-tapering substantially frusto-conical internally-threaded central portion received substantially coaxially in said coil and having a flange portion provided with opposed notches to receive the ends of the coil, the outer diameter of the flange portion being smaller than the coil inner diameter so that the flange portion is receivable within the coil, means to fasten said flange portion to said one side of the main body, and a fastening bolt extending through the wall of the housing substantially axially in the coil and threadedly engaged in said central portion of the anchor nut member.

3. In a gas vaporizer, a main operating assembly comprising a main body including fluid inlet and outlet conduit connections and a helical vaporizing coil projecting from one side of said main body and communicating with said inlet and outlet connections, a heat transfer housing receiving said vaporizing coil and engaging the peripheral margin of said one side of the main body around the coil, a non-ferrous metal anchor nut member adjacent to said one side of the main body, said anchor nut member being provided with an outwardly-tapering substantially frusto-conical internally-threaded central portion and a base flange secured to said one side of the main body, said flange having diametrically-opposed notches receiving the opposite end portions of the coil, the outer diameter of the flange being smaller than the coil inner diameter so that the flange is receivable within the coil, means to fasten said flange to said one side of the main body, said internally-threaded central portion being received substantially coaxially in said coil, and a fastening bolt extending through the wall of the housing substantially axially in the coil and threadedly engaged in said central portion of the anchor nut member.

References Cited

UNITED STATES PATENTS

| | | | |
|---|---|---|---|
| 1,161,111 | 1/1916 | Pope | 123—122 |
| 2,231,605 | 2/1941 | Stephenson et al. | 123—122 |
| 2,234,557 | 3/1941 | Hungerford | 151—41.7 |
| 2,406,070 | 8/1946 | Funk | 151—21 |
| 2,789,615 | 4/1957 | Allen | 151—41.7 |
| 3,024,773 | 3/1962 | Yamaoka | 165—51 X |
| 3,093,222 | 6/1963 | Christoffersen et al. | 151—41.7 X |
| 3,144,895 | 8/1964 | Linger | 151—41.7 X |
| 3,253,647 | 5/1966 | Deshaies | 165—51 X |

ROBERT A. O'LEARY, *Primary Examiner.*

A. W. DAVIS, Jr., *Assistant Examiner.*